Aug. 11, 1959   F. L. KAUFFMAN ET AL   2,898,961
EGG BREAKER AND SHELL EXPRESSER
Filed Sept. 16, 1955   4 Sheets-Sheet 1

FLOYD L. KAUFFMAN
DELOS B. VANDOLAH
ALLEN W. SHARP
INVENTORS

BY R. G. Story
ATTORNEY

Aug. 11, 1959    F. L. KAUFFMAN ET AL    2,898,961
EGG BREAKER AND SHELL EXPRESSER

Filed Sept. 16, 1955    4 Sheets-Sheet 3

FLOYD L. KAUFFMAN
DELOS B. VANDOLAH
ALLEN W. SHARP
INVENTORS

BY R. G. Story
ATTORNEY

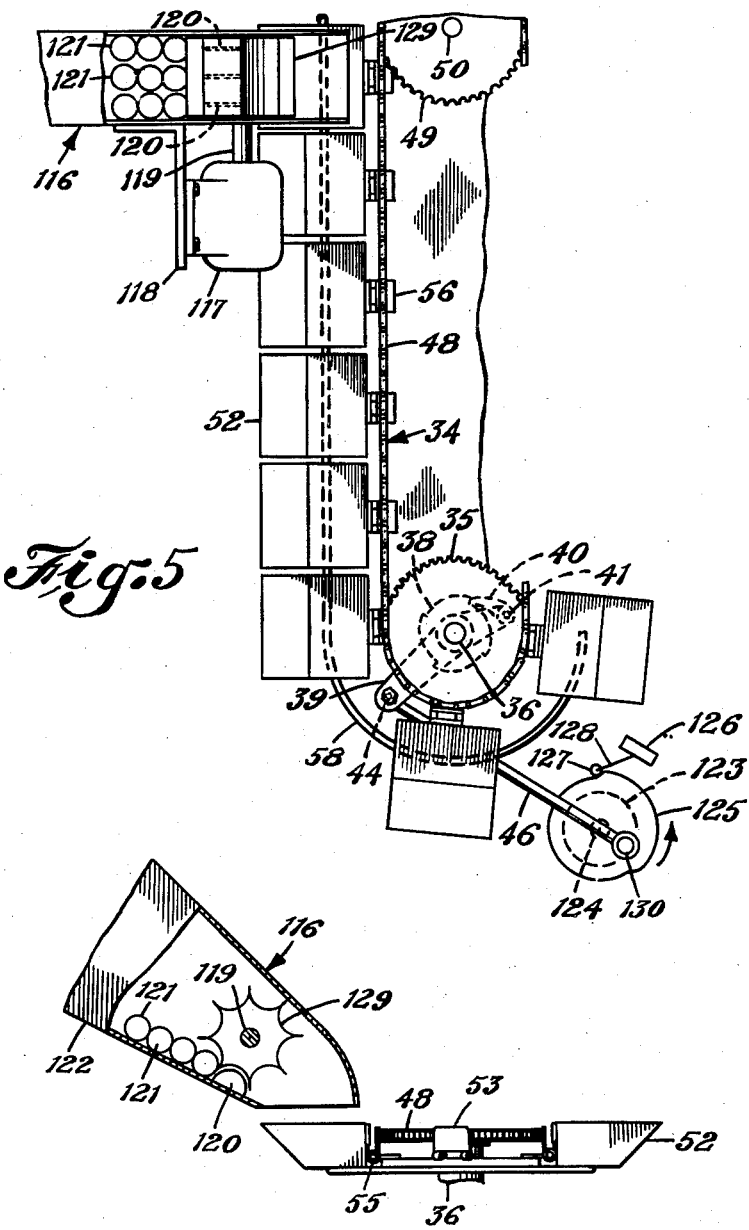

ABritish United States Patent Office
2,898,961
Patented Aug. 11, 1959

2,898,961

EGG BREAKER AND SHELL EXPRESSER

Floyd L. Kauffman, Palos Park, and Delos B. Van Dolah, Chicago, Ill., and Allen W. Sharp, Ottumwa, Iowa, assignors to Swift & Company, Chicago, Ill., a corporation of Illinois Application September 16, 1955, Serial No. 534,780

15 Claims. (Cl. 146—2)

The present invention relates to apparatus for handling eggs. More specifically, the present invention is directed to apparatus for separating egg magma from egg shells.

Many types of egg handling apparatus have been devised in an effort to provide an automatic system capable of recovering either whole egg meats or separated yolks and whites from shelled eggs. Various egg breaking and separating machines have been found to operate efficiently. However, in most instances, such apparatus is not capable of fully extracting the meat of the egg from the shell. It is, therefore, an object of the present invention to provide apparatus for increasing the yield of egg magma recovered from whole eggs.

Still another object of this invention is to provide apparatus for increasing the yield of egg whites recovered from whole eggs.

It is a further object of this invention to provide apparatus capable of presenting egg meat and associated shells for inspection during the egg handling process while materially reducing labor requirements.

Still a further object is to provide apparatus capable of allowing more efficient inspection of the egg meat and shells during the egg breaking and separating process while reducing the loss of marketable egg meat which accompanies the occasional presence of inferior egg meat.

Another object is to provide apparatus capable of allowing more efficient inspection of egg meats and shells during the egg breaking and separating process, thereby reducing the loss of marketable egg whites which accompanies the occasional presence of broken egg yolks.

Still another object is to provide apparatus for handling egg shells which materially increases residual egg meat recovery.

Another object is to provide egg shell handling apparatus suitable for use in conjunction with the majority of existing egg breaking and egg meat conveying machines.

Other objects not specifically set forth will become apparent from the following detailed description.

Figure 3:
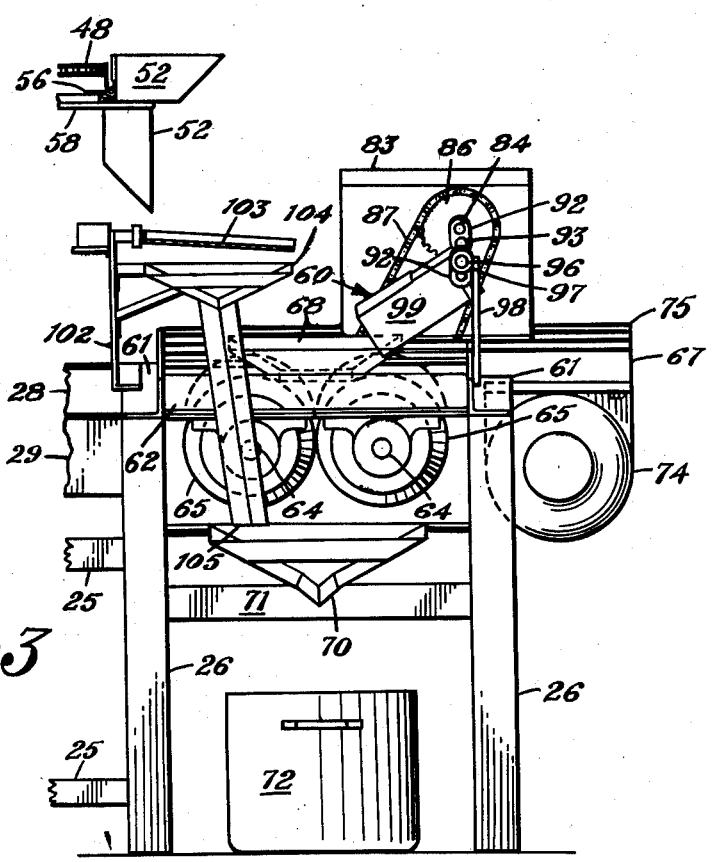

Figure 3 is an end view of the shell expressing apparatus showing a partial view of the shell conveyor of the present invention to more clearly demonstrate the operative position of the expressing means. Also shown in this figure are means designed to remove the bulk of the egg magma from the egg shells when the apparatus of the present invention is used to obtain whole egg material without separating egg whites from egg yolks.

Figure 4:
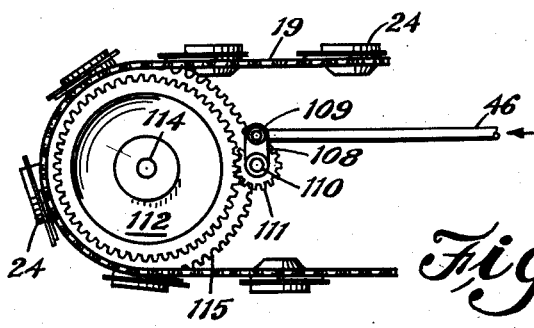

Figure 4 is an elevation of a section of a suitable egg meat conveyor drive means which demonstrates a manner in which the operation of the egg meat conveyor can be synchronized with the operation of the egg shell conveyor of the present invention.

Figure 5 is a plan view of the apparatus of the present invention which partially shows bulk egg breaking and egg meat and egg shell conveying apparatus suitable for use in conjunction with the shell expressing apparatus of the present invention.

Figure 6 is an end view of one form of bulk egg breaking means which may be used in connection with the conveying apparatus of Figure 5.

Figure 1:
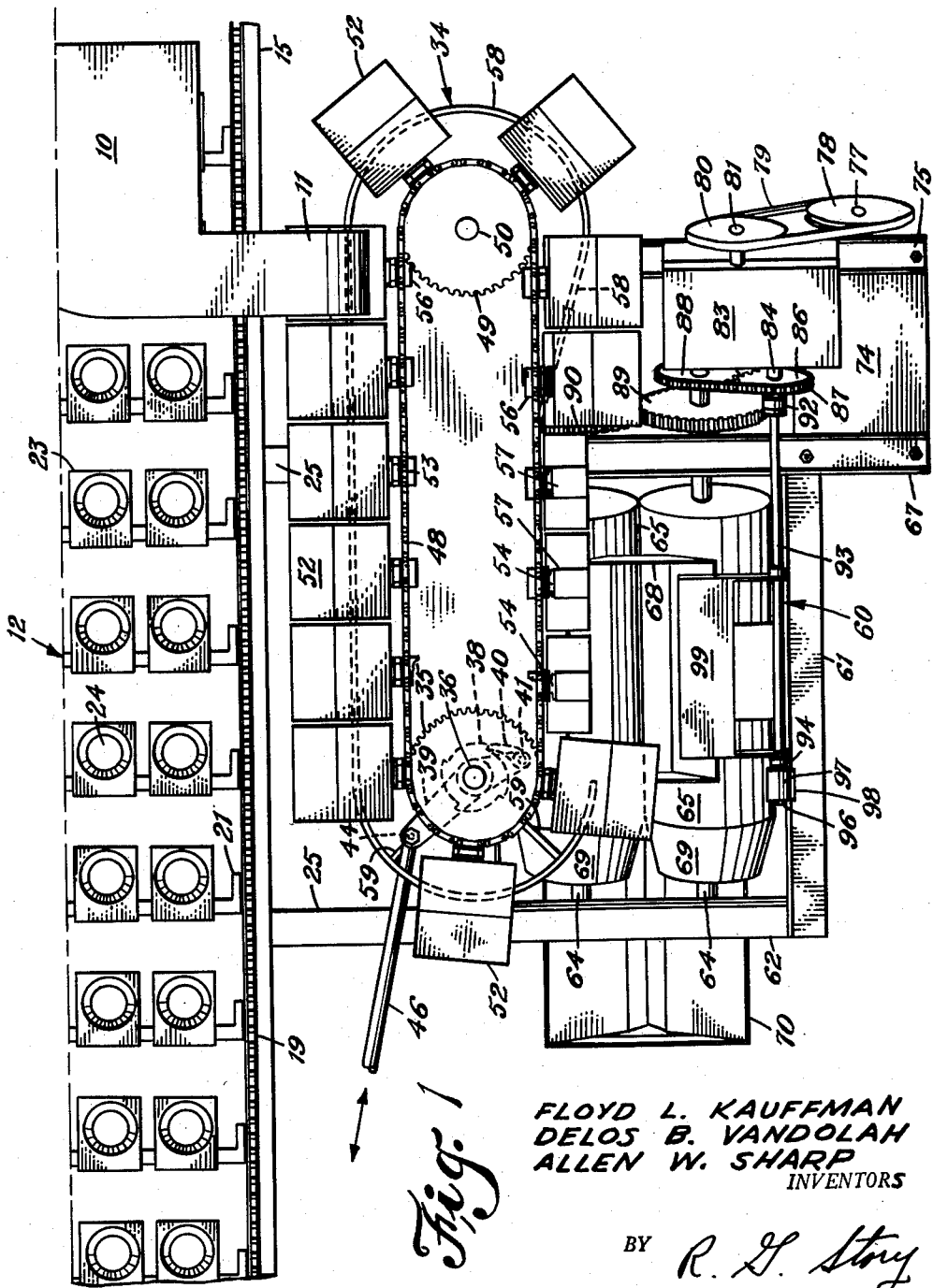
Figure 1 is a plan view of the apparatus of the present invention which, for purposes of simplification, only partially shows an egg breaking and egg meat conveying apparatus capable of separating egg whites from egg yolks and suitable for use in conjunction with the shell handling apparatus of the present invention.
Figure 2:
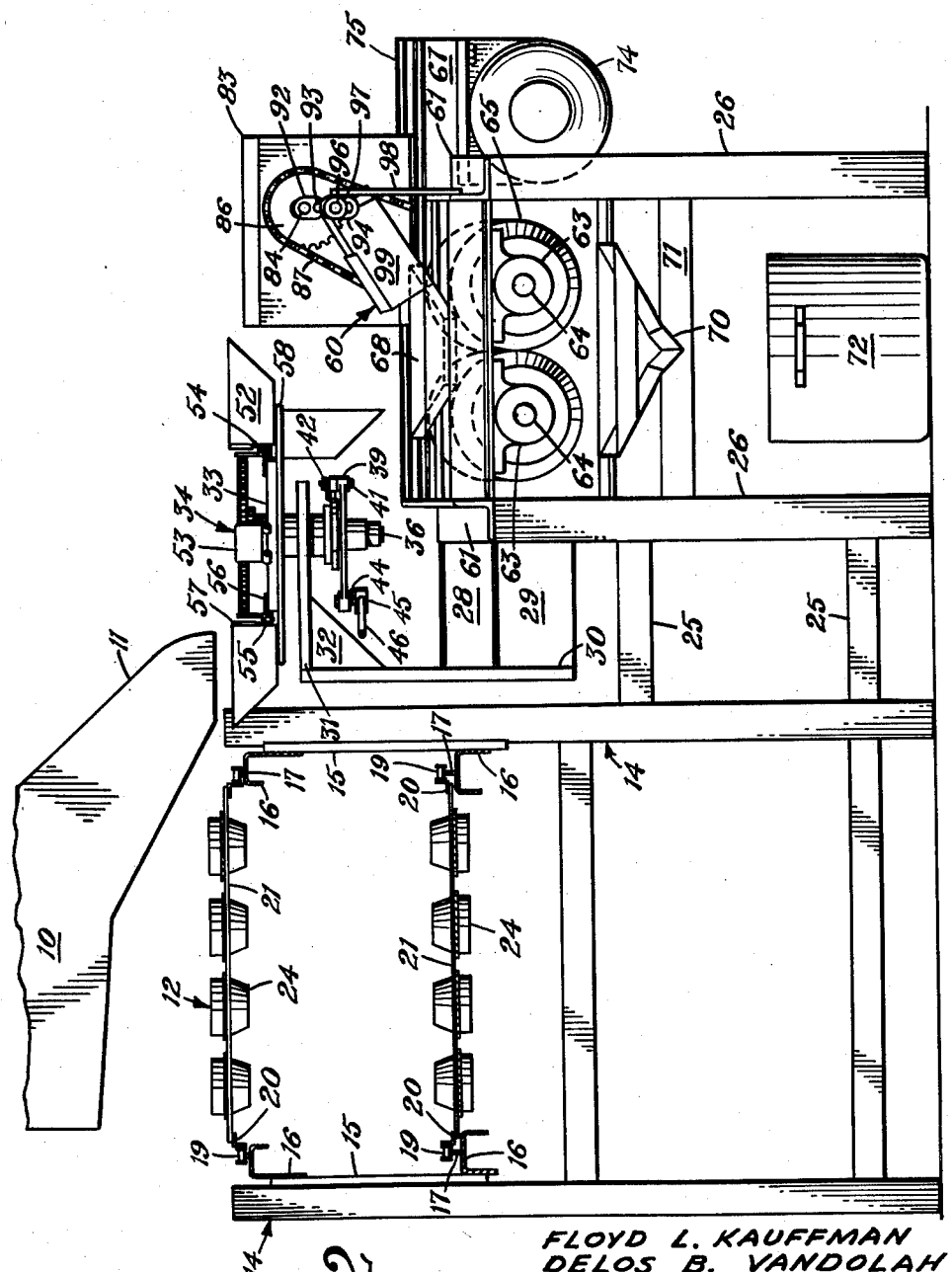
Figure 2 is an end view of the apparatus of the present invention with only a partial sectional showing of the egg breaking and egg meat conveying apparatus of Figure 1.

In Figures 1 and 2, the egg breaking and egg white and egg yolk separating and conveying portion of the apparatus is not shown in any great detail. The schematic showing used is considered suitable to properly illustrate the manner in which the shell handling apparatus of the present invention can be used in conjunction with existing egg breaking and egg meat conveying systems. For example, the partially schematic representation of the egg breaking and egg white and egg yolk separating and conveying apparatus is of the type described in the U.S. Patents Nos. 2,229,349 and 2,521,907 issued to I. M. Sigler and J. C. Gill, respectively. The Sigler apparatus is an egg breaking and egg meat dividing and conveying system which can be suitably used in conjunction with the shell handling portion of the present invention. The Gill apparatus is directed to a similar system also suitable for use in conjunction with the shell handling system of the present invention. The disclosures of these two patents are hereby incorporated by reference. In view of these patents and in view of the various types of egg breaking and egg meat conveying systems presently known, it is not believed necessary to provide any detailed explanation of this portion of the total system of the present invention.

Referring specifically to the apparatus shown in Figures 1 and 2, egg breaker 10 is shown in schematic form as containing egg chute 11. Egg breaker 10 is associated with egg meat conveyor 12 which is capable of separating egg yolks from egg whites and which is shown in sufficient detail to generally explain its operation. Egg breaker 10 and egg meat conveyor 12 are mounted on a general frame 14. Conveyor frame 15 which properly positions egg meat conveyor 12 is also mounted on frame 14. Attached to conveyor frame 15 are conveyor mounts 16 which, in turn, support chain tracks 17 upon which chain 19 moves. Attached to chain 19 at spaced intervals are brackets 20 which support cup carriages 21. Trays 23 are mounted on the cup carriages 21 and support egg meat cups 24. As the eggs are broken, egg meats are separated from their shells by the egg breaker 10 and are deposited in cups 24, the contents of a single egg to each cup. Cups 24 are so designed as to effect a separation of the egg whites and egg yolks. As seen in Figure 2, egg meat conveyor 12 is shown containing spaced rows of 4 cups each, indicating that egg breaker 10 in this particular instance contains facilities for breaking 4 eggs at a single time. Cups 24 are advanced by chain 19 which is driven by suitable means, a portion of which is to be described in connection with Figure 4.

Cross members 25 of general frame 14 aid in supporting and positioning vertical frame members 26, which support the shell treating apparatus of the present invention. Horizontal frame members 28 and 29 extend from one of the vertical frame members 26 to support vertical frame member 30 which has mounted at the top portion thereof shell conveyor support 31 which in turn suitably supports frame member 33. Wedge 32 aids in positioning and maintaining the weight of shell conveyor 34. Referring particularly to Figure 1, shell conveyor 34 contains sprocket 35 which is mounted on shaft 36. Also mounted on shaft 36 is a ratchet 38 and arm 39. At one end of arm 39 and attached thereto by shaft 41 is pawl 40 which is urged toward the center of arm 39 by spring 42 which can be clearly seen in Figure 2. The remaining end of arm 39 is attached to rod end 45 of rod 46 by shaft 44. Reciprocal motion imparted to rod 46 operates arm 39 to periodically rotate sprocket 35 through the operation of pawl 40 and ratchet 38. The periodic rotation of sprocket 35 imparts movement to chain 48 which in turn is supported at its other end by sprocket 49 mounted on shaft 50. Attached to chain 48 are pans 52 which, as shown in the drawings, are formed in the shape of scoops.

Referring particularly to Figures 2 and 5, pans 52 are detachably mounted on chain 48 through the insertion of a portion of hinge leaf 54 in sheath 57 attached to the back members of pans 52. Hinge leaf 54 is connected to the cooperating hinge leaf 53 by pin 55. Hinge leaf 53 is suitably attached to chain 48. Leaf 56 (see Figure 2) rotates about pin 55 with hinge leaf 54 as pans 52 are dumped, and ultimately contacts the back surface of hinge leaf 53 to limit the length of the arc described by the downward swing of pans 52. As chain 48 moves, pans 52 advance around the area described by the enclosed path of travel of chain 48. During the bulk of the distance traveled along this path, the pans are held in a plane horizontal to the enclosed path of travel by supporting rod 58 which is connected to frame member 33 by bars 59 shown in Figures 1 and 5. In Figure 1, supporting rod 58 is shown as ending abruptly near one side of sprocket 35 and is also shown as returning to its original position near one side of sprocket 49. During the distance traveled between the ending and beginning of supporting rod 58, pans 52 are allowed to swing on their connecting hinge, thereby allowing the egg shells received from chute 11 to be dumped.

Due to the particular arrangement of egg shell conveyor 34 in relation to egg meat conveyor 12 and chute 11, the shells of each series of 4 eggs are deposited in a single pan 52 through chute 11 at the same time that the egg meats of the 4 eggs are deposited in separate cups 24. The synchronization existing between the driving means of egg meat conveyor 12 and egg shell conveyor 34, which will be explained in conjunction with Figure 4, causes pans 52 to be advanced at the same speed as their corresponding egg meat cups 24. In this manner, the egg meat can be inspected and unsuitable egg meat can be removed along with their shells by detaching the proper meat and shell receptacles. Very little waste occurs since, for example, if one egg is defective, only its meat and the shells of four eggs are discarded. Cups 24 and pans 52 are easily detached for this purpose and new receptacles can be readily introduced into the system.

Shell expressor 60 is shown positioned on vertical frame members 26 to one side of the shell conveyor 34. Frame members 26 support L-beams 61 which are mounted at an angle as shown in Figure 2. Extending between L-beams 61 is a cross member 62 which contains bearings 63 in which are journaled the ends of shafts 64. Rollers 65 are mounted on shafts 64 and are preferably made of rubber. The other ends of shafts 64 are suitably journaled in bearings (not shown) supported by cross member 67. Trough 68 is mounted directly over rollers 65. The trough has slanted sides and an opening in its bottom portion to allow egg material to pass to rollers 65. Rollers 65 have tapered ends 69 as shown in Figure 1. Trough 70 is located directly below rollers 65 and is supported by cross member 71. Trough 70 is mounted at an angle similar to that of rollers 65 and contains an opening at one end thereof which is directly over receptacle 72 (Figure 2).

When pans 52 are dumped, as previously described, egg shells and residual egg meat are deposited into trough 68. The slanted sides of trough 68 cause the material to move toward the opening in the bottom central portion of the trough through which it ultimately passes. The material is thereby deposited close to the points of contact of rollers 65. Since rollers 65 are mounted at an angle, as shown in Figure 2, eggs meat which is expressed from the shells as the shells are drawn between the rollers flows toward the tapered ends 69 of the rollers and ultimately is deposited in trough 70 from which it is delivered into receptacle 72. The egg shells meanwhile travel between the rollers 65 and are deposited below the rollers in suitable receptacles.

The driving means for egg shell expressor 60 includes motor 74 held by cross members 67 and 75 and output shaft 77. The shaft from the motor 74 is attached to pulley 78 which drives belt 79 and pulley 80 (see Figure 1). Shaft 81 supports pulley 80 and extends into gear reducer 83. Shaft 84 extends out from gear reducer 83 and drives sprocket 86. Chain 87 is associated with sprocket 86 and transmits power to sprocket 88 which is mounted on one of the shafts 64. Gear 89, also mounted on said shaft 64, meshes with gear 90 to drive roller 65 on the remaining shaft 64. In this manner rollers 65 are rotated to express residual egg meat from the egg shells.

Referring back to shaft 84, an eccentric 92 is mounted on the end thereof and contains rod 93 which in turn is attached at its other end to eccentric 94. Shaft 96 is attached to eccentric 94 and has its other end journaled in bearing 97 which, in turn, is mounted on support 98. Pusher 99 which contains relatively high sides and a front face (not shown) is mounted at a point along rod 93. In operation, as rod 93 rotates around the longitudinal axis of the shafts 84 and 96, pusher 99 is moved backward and forward across the surface of the slanted side of trough 68 opposite the side of trough 68 which is positioned below pans 52.

Egg shells dumped from pans 52 accumulate in trough 68. The force of subsequently dumped shells acts to push the accumulated shells through the opening in the bottom of trough 68 toward rollers 65. Pusher 99 operates to force any egg shells which may accumulate against the side of trough 68 opposite the side positioned beneath pans 52 toward the center of the trough. The particular driving means used in operating pusher 99 causes the base of the pusher to be tilted so as to lift the pusher from contact with the side of the trough as it is being returned to the top of the said side. This movement prevents shells and residual meat from being trapped behind the front surface of the pusher.

In Figure 3, a modification of the apparatus of the present invention is shown which is especially adaptable for use in connection with bulk egg breaking means such as is pictured in Figures 5 and 6. Intermediate of egg shell conveyor 34 and shell expressor 60 is screen 103 mounted on bracket 102. Trough 104 lies directly below screen 103 and is also mounted on bracket 102. Chute 105 extends downwardly from trough 104 to a position directly above trough 70. As broken egg shells and associated egg meat are dumped from pans 52 they fall upon screen 103 which is sufficiently tilted so as to allow the egg shells to be forced by their own weight toward the end of screen 103 and down into trough 68. At the same time, the bulk of the egg meat separates from the shells and falls through screen 103 into trough 104 and down chute 105 into trough 70, ultimately being delivered into receptacle 72. Screen 103 can be vibrated by suitable means if this is found to be desirable. By vibrating screen 103, the amount of meat passing through the screen is greatly increased. Screens of a mesh of approximately ½ inch have been found satisfactory. Various materials including galvanized iron can be used for the screen.

Figure 4 demonstrates a suitable manner of synchronizing the movements of egg meat conveyor 12 and egg shell conveyor 34. As can be seen, rod 46 is attached by pin 109 to eccentric 108 which in turn is operatively attached to gear 111 by shaft 110. Gear 111 is driven by gear 112 which is mounted on shaft 114. Sprocket 115 is mounted on shaft 114 and drives chain 19. This arrangement causes rod 46 to reciprocate, thereby driving shell conveyor 34 as previously described.

In Figure 5, bulk egg breaking means 116 are shown in association with egg shell and egg meat conveying apparatus 34. Variable speed motor 117 mounted on bracket 118 acting through shaft 119 turns egg crushing or slitting means 120. Whole shell eggs 121 are fed either by hand or by suitable conveying means (not shown) to chute 122 where they are engaged and broken by crushers 120. The broken shells and exposed egg meats are then deposited in pans 52 of conveyor 34.

Conveyor 34 contains sprocket 35 which is mounted on shaft 36. Also mounted on shaft 36 are ratchet 38 and arm 39. Pawl 40 is attached to one end of arm 39 by means of pin 41 and is urged toward the center of the arm by spring 42 (which can be seen in Figure 2). The other end of arm 39 is attached to rod 46 by pin 44. The opposite end of rod 46 is connected to cam 125 by means of pin 130. Reciprocal motion imparted to rod 46 by gear motor 123 through pin 130 eccentrically mounted on cam 125 operates arm 39 to periodically rotate sprocket 35 by means of pawl 40 and ratchet 38. This periodic rotation of sprocket 35 imparts movement to chain 48 which is only partially shown in Figure 5. Chain 48 is supported at its other end by sprocket 49 mounted on shaft 50. Attached to chain 48 are pans 52. Gear motor 123 also rotates cam 125 which causes micro switch 126 to be periodically activated by means of cam follower 127 and switch arm 128. Micro switch 126 controls the operation of variable speed motor 117 which, as is described above, activates egg breaking means 120. This coordinated action between variable speed motor 117 and gear motor 123 allows egg meats and broken shells to be sent through chute 122 only while a pan is positioned beneath the chute.

In bulk egg breaking it is preferable to employ the modification shown in Figure 3 in association with conveyor 34 and shell expressor 60. Said modification consists of screen 103 mounted on bracket 102, trough 104 located directly beneath screen 103 and also mounted on bracket 102, and chute 105 which extends downwardly from trough 104 to a position directly above trough 70. As is described in connection with Figure 3, broken egg shells and egg meats are dumped from pans 52 where they fall upon screen 103 which is sufficiently tilted so as to allow the egg shells to be forced by their own weight toward the end of the screen 103 and down into trough 68. At the same time, the bulk of the egg meat separates from the shells and falls through screen 103 into trough 104 and down chute 105 into trough 70, ultimately being delivered into receptacle 72. By vibrating screen 103, the amount of meat passing through this screen is greatly increased. As is indicated above, screens of a mesh of approximately one-half inch have been found satisfactory. Various types of material can be used for this screen, including the very satisfactory galvanized iron.

Figure 6 shows an end view of one form of bulk egg breaking means that may be used with the conveying and expressing means described in connection with Figure 5. As whole eggs 121 are fed into chute 122, they are picked up by star wheel 129 which slits the egg shells and sends the shells and exposed meat down chute 122 into pans 52. Star wheel 129 is turned by means of variable speed motor 117 acting through shaft 119. One or several such star wheels may be employed, depending on the volume of eggs to be handled.

Undesirable egg meats and shells can be removed from conveyor 34 by removing detachable pans 52 as previously described. Before the pans are placed back into the system, they should be washed and sterilized to insure against contamination of the good eggs. It is apparent that a number of sterilized receptacles can be kept on hand to replace those removed containing inedible product, thereby utilizing the full capacity of the system at all times. Due to the particular arrangement of the apparatus of the present invention and due to the efficiency of this apparatus, it is possible that a single operator can efficiently carry out the operation. At the most, only two operators are necessary, one to inspect and remove undesirable products, and the other to feed the egg breaking portion and to empty the product receptacles.

Egg meats collected by the egg meat conveyor 12 can be treated in any suitable manner. Normally, as is apparent in Figure 2, the meat receiving cups 24 are returned in an inverted manner to be refilled by the egg breaking portion 10. By this arrangement, the egg meat may be collected at the end of egg meat conveyor 12 in suitable receptacles which are capable of catching the egg meat as it is dumped from the cups as the cups become inverted in a manner similar to that shown in Figure 4.

Depending upon their condition, it may be necessary to wash the eggs prior to breaking in order to remove any incrusted dirt therefrom. It may also be necessary to treat the unbroken eggs so as to reduce the bacterial count on the shells to a satisfactory degree. It has been found that proper treatment is obtained by immersing the eggs in water heated to from about 180° F. to about 200° F. for a period of about five to about ten seconds. The brief period of time in which the eggs are subjected to heat in this manner prevents the temperature of the egg meats from being raised to a point at which coagulation may occur.

The following examples illustrate comparative determinations of the bacterial count of whole egg material and residual egg material obtained from the shell of a given egg, which shell was subjected to the above treatment:

*Eggs dipped in water at 180° F. for 10 seconds*

| Batch | Whole egg material bacterial count | Residual egg material bacterial count |
| --- | --- | --- |
| A | 510,000 | 210,000 |
| B | 1,970,000 | 800,000 |
| C | 194,000 | 183,000 |
| D | 280,000 | 210,000 |
| E | 56,000 | 52,000 |
| F | 4,800,000 | 4,000,000 |
| G | 1,400,000 | 1,200,000 |

As is apparent from the chart, this method of sanitizing eggs produces residual egg meat from egg shells which has a lower bacterial count than whole egg meat from the same eggs.

Obviously, many modifications and variations of the invention as hereinbefore set forth may be made without departing from the spirit and scope thereof, and therefore only such limitations should be imposed as are indicated in the appended claims.

We claim:

1. A device suitable for use in inspecting eggs, the said device comprising: a frame, egg breaking means on said frame, egg meat conveying means on said frame associated with said egg breaking means to receive the meat of the broken eggs and move said meat along a predetermined path, said egg meat conveying means including meat receptacles for receiving the meat of the broken eggs, each of said meat receptacles capable of detachment when the egg meat contained therein is undesirable, and separate open-topped shell conveying and receiving means on said frame associated with said egg breaking means and said egg meat conveying means to receive the shells of the broken eggs and move said shells along a predetermined path substantially parallel to the path of movement of said egg meat conveying means and at a rate allowing substantial continual association of the shells with their respective egg meats for inspection purposes, said shell conveying means including shell receptacles for receiving the shells of the broken eggs, each of said shell receptacles capable of detachment when the egg meat of its associated egg meat receptacle is found undesirable.

2. A device suitable for use in recovering residual meat from the shells of eggs, the said device comprising: a frame, shell conveying means on said frame capable of movement along a predetermined path, said shell conveying means including receptacles for receiving and conveying shells along said path, said receptacles removable from said conveyor for purposes of removing undesirable shells from said path, said receptacles hinged to said conveyor for downward swinging movement at a point along said path, and shell expressing means on said frame at said point to receive said shells from said receptacles and express residual meat therefrom, said shell expressing means including paired rollers mounted at an angle to the horizontal axis of said frame to allow the expressed residual meat to flow off the lowest end of said rollers while the shells pass between said rollers.

3. A device suitable for use in recovering residual meat from the shells of eggs, the said device comprising: a frame, egg shell and egg meat conveying means on said frame capable of movement along a predetermined path, said shell and meat conveying means including receptacles detachably mounted on said conveyor for purposes of removing undesirable shells and meat of a given egg from said path, means associated with said conveying means for removing the bulk of said meat from said shells, and shell expressing means associated with said conveying means to remove residual egg meat from said shells.

4. A device suitable for use in recovering residual meat from the shells of eggs, the said device comprising: a frame, egg shell and egg meat conveying means on said frame capable of movement along a predetermined path, said shell and meat conveying means including receptacles detachably mounted on said conveyor for purposes of removing undesirable shells and meat from said path, screening means on said frame and positioned at said point along said path to receive the shells and meat from said receptacles, said screening means positioned at an angle to allow said shells to move across its surface by their own weight while the bulk of said meat is separating from said shells, and shell expressing means on said frame associated with said screening means to receive the shells therefrom and express residual meat therefrom.

5. A device suitable for use in recovering residual meat from the shells of eggs, the said device comprising: a frame, egg shell and egg meat conveying means on said frame capable of movement along a predetermined path, said shell and meat conveying means including receptacles detachably mounted on said conveyor for purposes of removing undesirable shells and meat from said path, said receptacles hinged to said conveyor for downward swinging movement at a point along said path, screening means on said frame and positioned at said point along said path to receive the shells and meat from said receptacles, said screening means positioned at an angle to allow said shells to move across its surface by their own weight while the bulk of said meat is separating from said shells, and shell expressing means on said frame associated with said screening means to receive the shells therefrom and express residual meat therefrom, said shell expressing means including paired rollers mounted at an angle to the horizontal axis of said frame to allow the expressed residual meat to flow off the lowest end of said rollers while the shells pass between said rollers.

6. A device suitable for use in recovering meat from the shells of eggs, the said device comprising: a frame, egg shell and egg meat conveying means on said frame capable of movement along a predetermined path, said shell and meat conveying means including receptacles for receiving and conveying shells and meat along said path, said receptacles removable from said conveyor for purposes of removing undesirable shells and meat from said path, said receptacles hinged to said conveyor for downward swinging movement at a point along said path, screening means on said frame and positioned at said point along said path to receive the shells and meat from said receptacles, said screening means positioned at an angle to allow said shells to move across its surface by their own weight while the bulk of said meat is separating from said shells, vibrating means on said frame and associated with said screening means to vibrate said screening means to aid in the removal of the bulk of the meat from the shells, and shell expressing means on said frame associated with said screening means to receive the shells therefrom and express residual meat therefrom, said shell expressing means including paired rollers mounted at an angle to the horizontal axis of said frame to allow the expressed residual meat to flow off the lowest end of said rollers while the shells pass between said rollers.

7. A device suitable for use in recovering residual meat from the shells of eggs, the said device comprising: a frame, shell expressing means on said frame, said expressing means including paired rollers mounted at an angle to the horizontal axis of said frame, said rollers having tapered ends, shell collecting means on said frame above said rollers, said collecting means suitable for directing shells between said rollers, and shell moving means on said frame associated with said collecting means to aid in directing shells between said rollers.

8. A device suitable for use in recovering residual meat from the shells of eggs, the said device comprising: a frame, shell expressing means on said frame, said expressing means including paired rollers mounted at an angle to the horizontal axis of said frame, said rollers having tapered ends, shell collecting means including a trough with slanted sides and an opening in its bottom portion on said frame above said rollers, said collecting means suitable for directing shells between said rollers, shell moving means on said frame associated with said collecting means to aid in directing shells between said rollers, and egg meat receiving means on said frame positioned at the lowest ends of said rollers.

9. A device suitable for use in recovering residual meat from the shells of eggs, the said device comprising: a frame, shell expressing means on said frame, said expressing means including paired rollers mounted at an angle to the horizontal axis of said frame, shell collecting means on said frame and above said rollers, said collecting means including an opening in the bottom portion thereof approximately over the points of contact of said rollers, slanted walls leading downwardly toward the bottom portion of said collecting means to receive shells from said shell conveying means and direct said shells between said rollers, and shell moving means on said frame and associated with at least one of said slanted walls of said collecting means to aid in directing shells between said rollers, said shell moving means including a housing having a pushing face resting on said wall, a shaft on said frame positioned in a horizontal plane rotated 90° from the longitudinal axis of said housing and attached to said housing, means attached to said shaft to move said shaft along an eccentric path about the longitudinal axis of said shaft and reciprocate said pushing face across the surface of said slanted wall, the eccentric movement of said shaft lifting said pushing face of said housing out of contact with said wall during the return of said face toward the top portion of said wall.

10. A device suitable for use in handling eggs for separation and inspection purposes, the said device comprising: a frame, egg breaking means on said frame, egg meat conveying means on said frame and associated with said egg breaking means to receive the meat of the broken eggs and move said meat along a predetermined path, shell conveying means on said frame and associated with said egg breaking means and said egg meat conveying means to receive the shells of the broken eggs and move said shells along a predetermined path substantially parallel to the path of movement of said egg meat conveying means and at a rate allowing substantial continual association of the shells with their respective egg meats for inspection purposes, and shell expressing means on said frame associated with said shell conveying means to receive the shells therefrom and remove residual egg meat from said shells.

11. A device suitable for use in handling eggs for separation and inspection purposes, the said device comprising; a frame, egg breaking means on said frame, egg meat conveying means on said frame and associated with said egg breaking means to receive the meat of the broken eggs and move said meat along a predetermined path, said egg meat conveying means including meat receptacles for receiving the meat of the broken eggs, each of said meat receptacles capable of detachment when the egg meat contained therein is undesirable, shell conveying means on said frame and associated with said egg breaking means and said egg meat conveying means to receive the shells of the broken eggs and move said shells along a predetermined path substantially parallel to the path of movement of said egg meat conveying means and at a rate allowing substantial continual association of the shells with their respective egg meats for inspection purposes, said shell conveying means including shell receptacles for receiving the shells of broken eggs, each of said shell receptacles capable of detachment when the egg meat of its associated egg meat receptacle is found undesirable, said shell receptacles hinged to said shell conveying means for downward swinging movement at a point along a path of movement of said shell conveying means, supporting means on said frame for mantaining said shell receptacles in a position substantially horizontal to said shell conveying means throughout substantially the total travel along said path of movement of said shell conveying means, and shell expressing means on said frame associated with said shell conveying means to receive the shells therefrom and remove residual egg meat from said shells.

12. A device suitable for use in handling eggs for separation and inspection purposes, the said device comprising: a frame, egg breaking means on said frame, egg meat conveying means on said frame and associated with said egg breaking means to receive the meat of the broken eggs and move said meat along a predetermined path, said egg meat conveying means including meat receptacles for receiving the meat of the broken eggs, each of said meat receptacles capable of detachment when the egg meat contained therein is undesirable, shell conveying means on said frame and associated with said egg breaking means and said egg meat conveying means to receive the shells of the broken eggs and move said shells along a predetermined path substantially parallel the path of movement of said egg meat conveying means and at a rate allowing substantial continual association of the shells with their respective egg meats for inspection purposes, said shell conveying means including shell receptacles for receiving the shells of broken eggs, each of said shell receptacles capable of detachment when the egg meat of its associated egg meat receptacle is found undesirable, said shell receptacles hinged to said shell conveying means for downward swinging movement at a point along the path of movement of said shell conveying means, supporting means on said frame for maintaining said shell receptacles in a position substantially horizontal to said shell conveying means throughout substantially the total travel along said path of movement of said shell conveying means, shell expressing means on said frame associated with said shell conveying means to receive the shells therefrom and remove residual egg meat from said shells, said shell expressing means including paired rollers mounted at an angle to the horizontal axis of said frame, shell collecting means on said frame above said rollers, said collecting means suitable for receiving shells from said shell receptacles and directing said shells between said rollers, and shell moving means on said frame and associated with said collecting means to aid in directing shells between said rollers.

13. A device suitable for use in handling eggs for separation and inspection purposes, the said device comprising: a frame, egg breaking means on said frame, egg meat conveying means on said frame and associated with said egg breaking means to receive the meat of the broken eggs and move said meat along a predetermined path, said egg meat conveying means including meat receptacles for receiving the meat of the broken eggs, each of said meat receptacles capable of detachment when the egg meat contained therein is undesirable, shell conveying means on said frame and associated with said egg breaking means and said egg meat conveying means to receive the shells of the broken eggs and move said shells along a predetermined path substantially parallel the path of movement of said egg meat conveying means and at a rate allowing substantial continual association of the shells with their respective egg meats for inspection purposes, said shell conveying means including shell receptacles for receiving the shells of broken eggs, each of said shell receptacles capable of detachment when the egg meat of its associated egg meat receptacle is found undesirable, said shell receptacles hinged to said shell conveying means for downward swinging movement at a point along the path of movement of said shell conveying means, supporting means on said frame for maintaining said shell receptacles in a position substantially horizontal to said shell conveying means throughout substantially the total travel along said path of movement of said shell conveying means, shell expressing means on said frame associated with said shell conveying means to receive the shells therefrom and remove residual egg meat from said shells, said shell expressing means including paired rollers mounted at an angle to the horizontal axis of said frame, shell collecting means on said frame and above said rollers, said collecting means including an opening in the bottom portion thereof approximately over the points of contact of said rollers, slanted walls leading downwardly toward the bottom portion of said collecting means to receive shells from said shell conveying means and direct said shells between said rollers, and shell moving means on said frame and associated with at least one of said slanted walls of said collecting means to aid in directing shells between said rollers, said shell moving means including a housing having a pushing face resting on said wall, a shaft on said frame positioned in a horizontal plane rotated 90° from the longitudinal axis of said housing and attached to said housing means attached to said shaft to move said shaft along an eccentric path about the longitudinal axis of said shaft and reciprocate said pushing face across the surface of said slanted wall, the eccentric movement of said shaft lifting said pushing face of said housing out of contact with said wall during the return of said face toward the top portion of said wall.

14. A device suitable for use in handling eggs for separation and inspection purposes, the said device comprising: a frame, egg breaking means mounted on said frame, egg meat and egg shell conveying means associated with said egg breaking means, receptacles detachably mounted on said conveying means to receive egg meat and broken egg shells from said egg breaking means, means associated with said conveying means for separating the bulk of said meat from said shells, and shell expressing means associated with said conveying means to remove residual egg meat from said shells.

15. A device suitable for use in handling eggs for separation and inspection purposes, the said device comprising: egg breaking means mounted on a frame, egg meat and egg shell conveying means associated with said egg breaking means to receive the meat and shells of the broken eggs and move said meat and shells along a predetermined path, said conveying means having detachable receptacles mounted thereon for purposes of removing undesirable egg meat and egg shells from said path, shell expressing means on said frame associated with said shell conveying means to receive the shells therefrom and remove residual egg meat from said shells, and screening means on said frame intermediate said shell conveying means and said shell expressing means to separate the bulk of said meat from said shells, said screening means positioned at an angle to allow the shells to move by their own weight off said screening means and into contact with said shell expressing means.

References Cited in the file of this patent

UNITED STATES PATENTS

| | | |
|---|---|---|
| 235,198 | Bell | Dec. 7, 1880 |
| 2,069,448 | Ireland et al. | Feb. 2, 1937 |
| 2,229,349 | Sigler | Jan. 21, 1941 |
| 2,423,233 | Funk | July 1, 1947 |
| 2,443,188 | Hodson | June 15, 1948 |
| 2,550,189 | Droege et al. | Apr. 24, 1951 |
| 2,655,965 | Gill | Oct. 20, 1953 |
| 2,760,536 | Willsey | Aug. 28, 1956 |